United States Patent
Chang et al.

(10) Patent No.: US 9,084,302 B2
(45) Date of Patent: Jul. 14, 2015

(54) CARPET ASSEMBLY CAPABLE OF GENERATING HEAT

(76) Inventors: Kwo-Chuang Chang, Taipei (TW); Yuan Wei, Taipei (TW)

(*) Notice: Subject to any disclaimer, the term of this patent is extended or adjusted under 35 U.S.C. 154(b) by 139 days.

(21) Appl. No.: 13/338,937

(22) Filed: Dec. 28, 2011

(65) Prior Publication Data

US 2012/0168427 A1    Jul. 5, 2012

(30) Foreign Application Priority Data

Dec. 29, 2010 (TW) ................ 99225421 U

(51) Int. Cl.
| | |
|---|---|
| H05B 3/34 | (2006.01) |
| H05B 3/22 | (2006.01) |
| F24D 13/02 | (2006.01) |

(52) U.S. Cl.
CPC *H05B 3/22* (2013.01); *F24D 13/02* (2013.01); *F24D 13/024* (2013.01); *H05B 2203/007* (2013.01); *H05B 2203/016* (2013.01); *H05B 2203/026* (2013.01); *Y02B 30/26* (2013.01)

(58) Field of Classification Search
CPC .. H05B 3/00; H05B 3/0004; H05B 3/20–3/32
USPC ......... 219/211, 212, 217, 528, 529, 544, 545, 219/546, 547, 548, 549
See application file for complete search history.

(56) References Cited

U.S. PATENT DOCUMENTS

| | | | |
|---|---|---|---|
| 6,278,085 B1* | 8/2001 | Abukasm ................ | 219/213 |
| 2009/0101306 A1* | 4/2009 | Reis et al. ............... | 165/56 |

* cited by examiner

*Primary Examiner* — Dana Ross
*Assistant Examiner* — Brandon Harvey
(74) *Attorney, Agent, or Firm* — Muncy, Geissler, Olds & Lowe, P.C.

(57) ABSTRACT

A carpet assembly capable of generating heat comprises a plurality of polygonal base plates and a plurality of connectors. Each polygonal base plate has a power connector part provided at each periphery of the polygonal base plate, a heat generation device, and a power connection line. The power connection line is connected with the power connector part and the heat generation device, so that when the power connection line is connected with an external power, the power connector part and heat generation device are in electric connection via the power connection line, and the heat generation device begins to produce heat. When the connectors are connected respectively with the power connector part provided at one periphery of one polygonal base plate, the plurality of polygonal base plates are in electric connection with each other and forms a carpet assembly capable of generating heat with large area.

4 Claims, 6 Drawing Sheets

CARPET ASSEMBLY CAPABLE OF GENERATING HEAT

TECHNICAL FIELD

The present invention relates to a carpet assembly capable of generating heat, which has simple structure, can be easily assembled according to the need of the users, and is suitable for electric carpets used on beds and for electric heating pads used on sofas of various shapes.

BACKGROUND

When in cold weather or in cold climate regions, the temperature at or near the floor level in a household is usually much colder under the influence of the cold weather. Accordingly, when people walk or stand still on the floor, they may feel cold because their feet are in contact with the cold floor and thus the body heat is carried away to the floor. Therefore, during the seasons in cold weather, various commodities used for keeping feet warm are available in the market, such as shoes and woolen socks. In addition to keeping people's feet warm, these commodities are also helpful to prevent the decline of their body temperature and consequently people may not feel chill.

In addition to putting shoes or socks directly on feet to keep the feet warm, various devices also can be in cold climate regions. For example, in buildings, warming stoves, room conditioners for heating, and hot water circulation systems embedded beneath the floors are commonly used to provide warm environment for the rooms. In the case of hot water circulation systems embedded under the floors, the floors can be made warmer so that people walking thereon may feel comfortable instead of feeling cold. Besides, in this case, it is more convenient for people to keep their feet warm without the use of shoes or socks. However, although the hot water circulation systems can be used to provide warm environment for the rooms, their maintenance is very troublesome. In addition, if only part of the floors in the rooms is required to be warmed, it is not economic and not environmental friendly to use such hot water circulation systems that are usually used to warm the whole floor in the rooms.

In order to overcome above shortcomings, inventor had the motive to study and develop the present invention to provide a carpet assembly capable of generating heat.

SUMMARY OF THE DISCLOSURE

An object of the present invention is to provide a carpet assembly capable of generating heat, which has simple structure and can be easily assembled according to the need of the users.

In order to achieve above object, the present invention provides a carpet assembly capable of generating heat comprising a plurality of quadrilateral base plates and a plurality of connectors. A layer, which can be made by fabric, leather, plastic, grass mat, or bamboo mat, is provided on the top surface of each of the plurality of quadrilateral base plates, and the top surface has a center provided with a recessed area, where the recessed area is communicated with a channel formed at four peripheries of each quadrilateral base plate. Under the top surface, each quadrilateral base plate is provided with four power connector parts, a heat generation device, and a power connection line. The power connector parts are provided respectively in the channel at four peripheries of each periphery of each the quadrilateral base plate and covered by the layer. The heat generation device is connected onto and provided in the recessed area and covered by the layer. A heat conducting layer is provided between the layer and the heat generation device and covers the heat generation device for conducting heat all over the top surface of the quadrilateral base plate, wherein the surface area of the heat conducting layer is larger than the top surface area of the heat generation device. The power connection line is independently provided in the recessed area, surrounds peripheries of the heat generation device and covered by the layer. The power connection line is respectively connected with the power connector parts and the heat generation device, so that when the power connection line is connected with an external power, the power connector part and the heat generation device are all in electric connection via the power connection line and consequently the heat generation device begins to produce heat. Each connector has two ends respectively provided with a conductive part. The two conductive parts are conductive to each other, where one end of each connector is located at the channel of one quadrilateral base plate, and the other end of the connector is located at the channel of another adjacent quadrilateral base plate. The conductive parts at the two ends of each connector are respectively connected with the power connector parts of any two adjacent quadrilateral base plates, the two adjacent quadrilateral base plates are in electric connection with each other by the connector and are abutted with each other. The plurality of the quadrilateral base plates is assembled in the way of providing each connector between any two quadrilateral base plates, so as to form a carpet assembly capable of generating heat with large area.

In implementation, the heat conducting layer is made by aluminum foil and the heat generation device is an electric heater.

The following detailed description, given by way of examples or embodiments, will best be understood in conjunction with the accompanying drawings.

DETAILED DESCRIPTION

Figure 1:
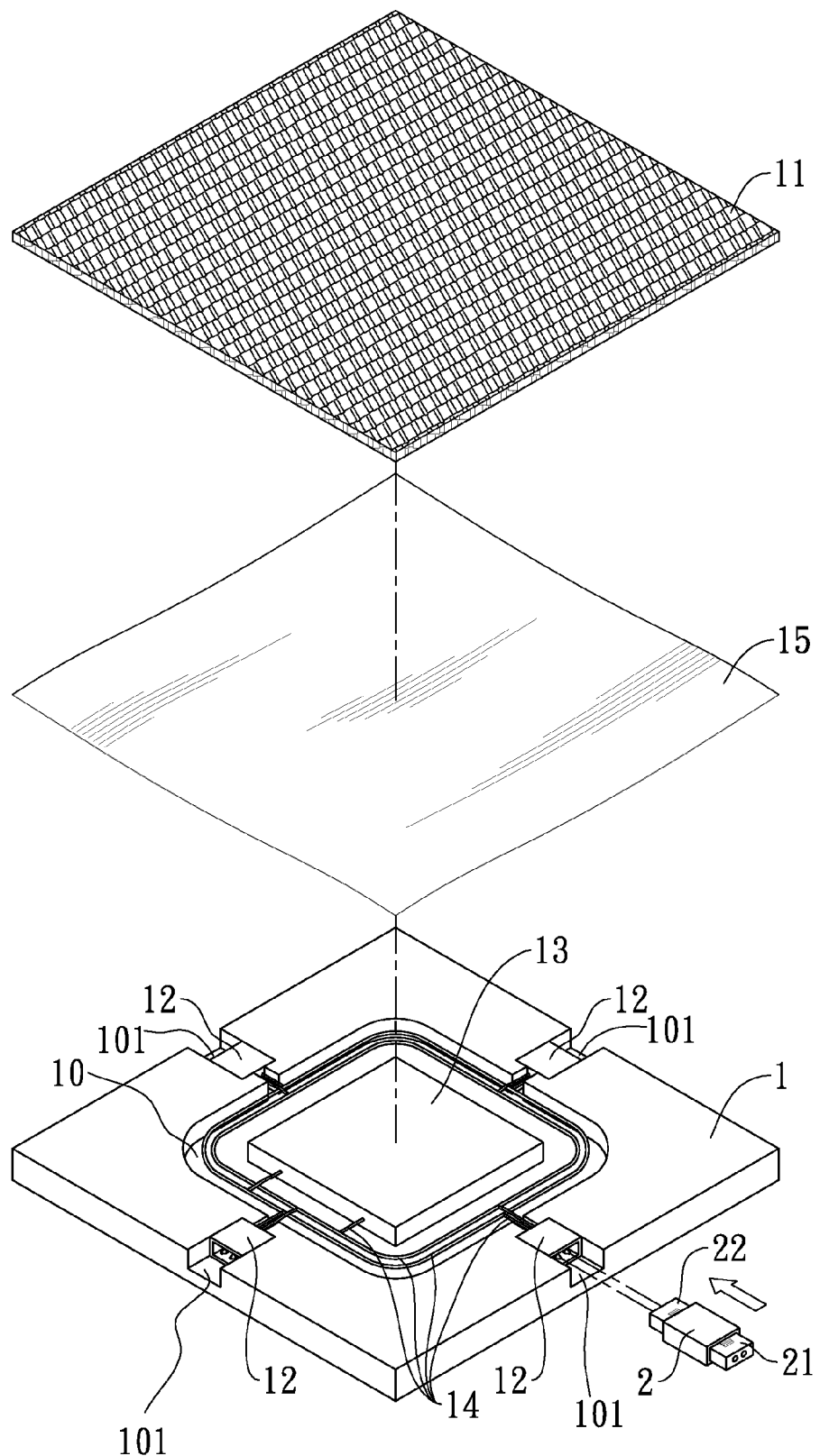
FIG. 1 is an exploded perspective view showing an embodiment of a carpet assembly capable of generating heat of the present invention.
Figure 2:
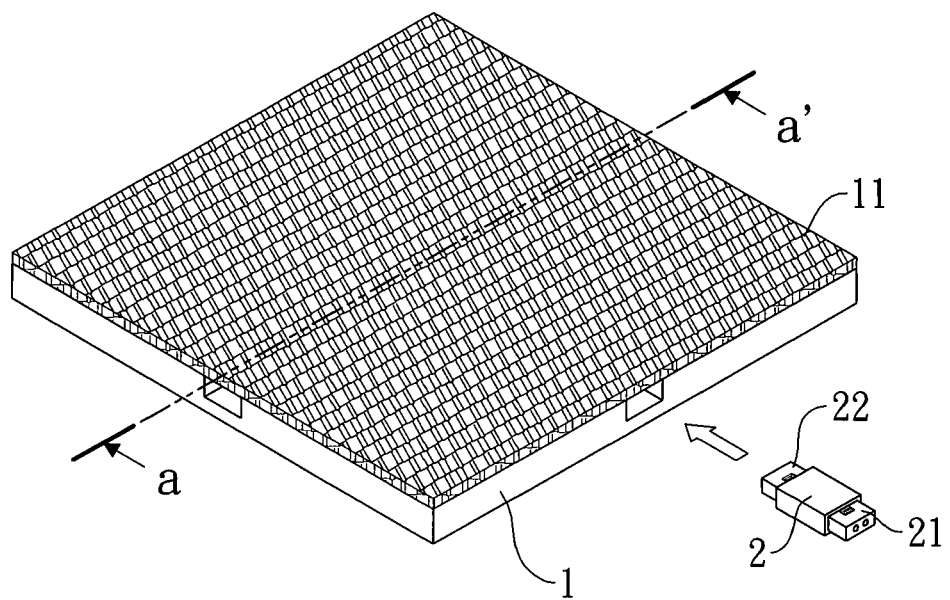
FIG. 2 is a schematic view showing a connector and a quadrilateral base plate of the embodiment of the present invention, where the connector and the quadrilateral base plate are not assembled.
Figure 3:
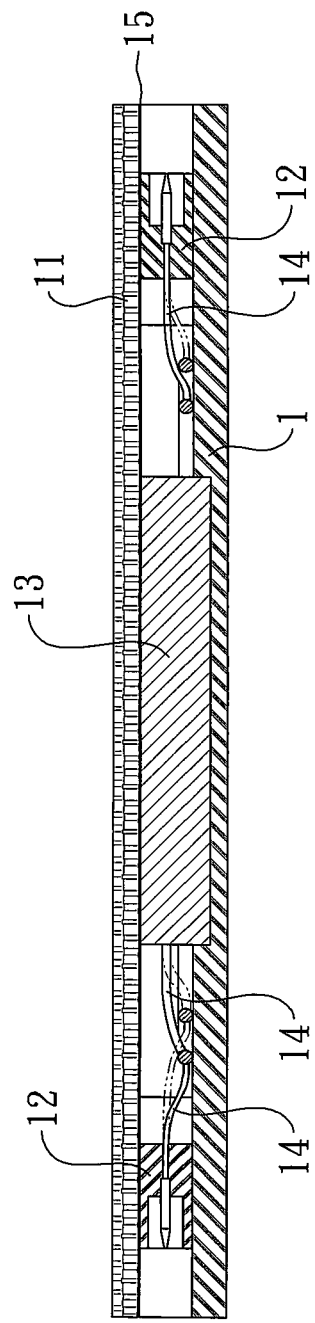
FIG. 3 is a cross-sectional schematic view showing the quadrilateral base plate of the embodiment of the present invention.
Figure 4:
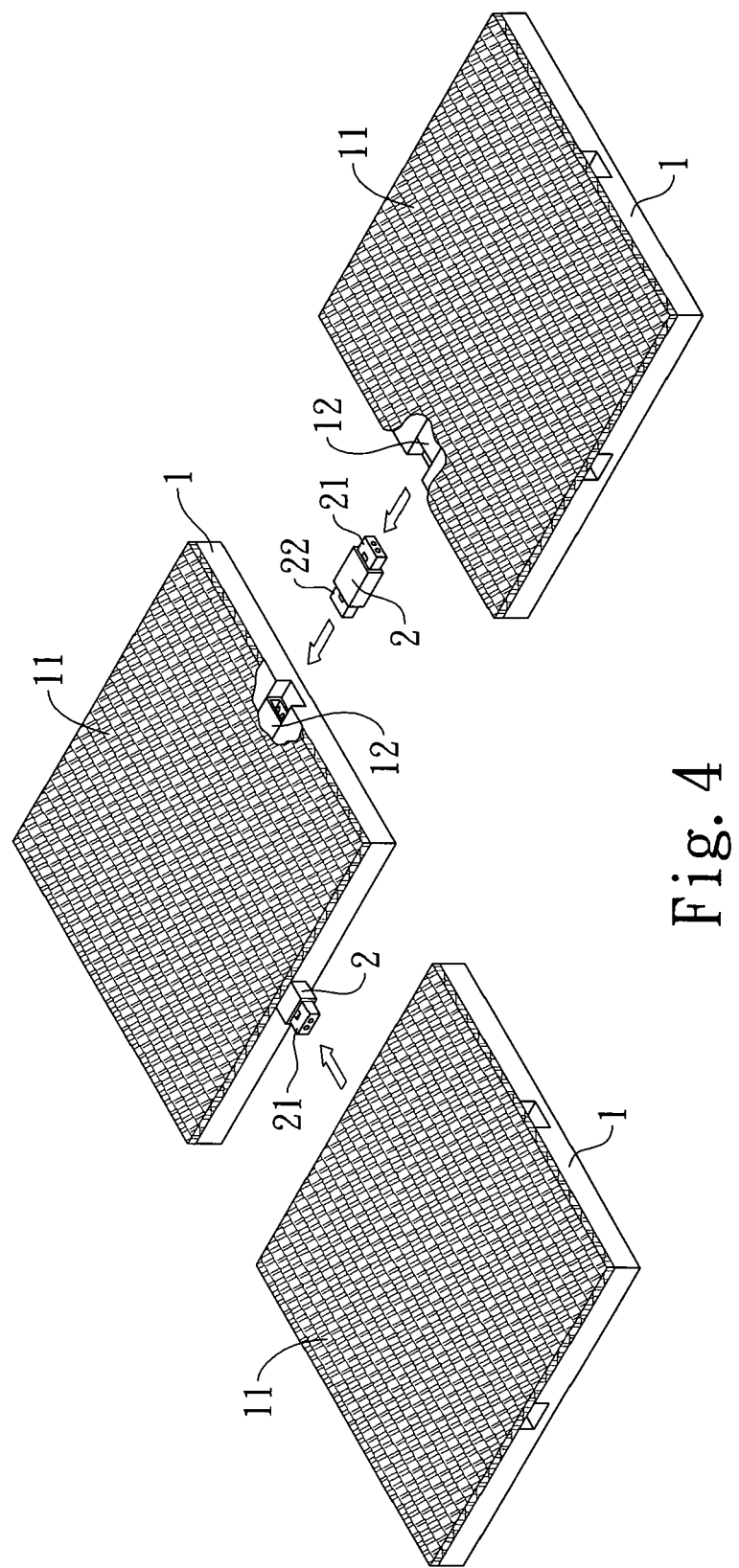
FIG. 4 is schematic view showing the embodiment of the assembled carpet assembly capable of generating heat of the present invention.

Please refer to FIGS. 1~4 showing an embodiment of the carpet assembly capable of generating heat according to the present invention. The carpet assembly capable of generating heat comprises a plurality of polygonal base plates 1 and a plurality of connectors 2.

Each of the plurality of the quadrilateral base plates 1 is provided on the top surface thereof with a layer 11 that can be made by fabric, plastic, leather, grass mat, or bamboo mat, and can be detachable from the top surface. The top surface has a center provided with a recessed area 10, where the recessed area 10 is communicated with a channel 101 formed at four peripheries of each quadrilateral base plate 1. Each quadrilateral base plate 1 is provided with four power connector parts 12, a heat generation device 13, and a power connection line 14, which is covered by the layer 11. In this embodiment, the power connector part 12 is provided respectively in the channel 101 at four peripheries of each quadrilateral base plate 1. The heat generation device 13 is an electric heater and is connected onto the quadrilateral base plate 1. Besides, the heat generation device 13 is covered thereon with a heat conducting layer 15. The heat conducting layer 15 is provided between the layer 11 and the heat generation device 13 and covers the heat generation device 13, and the heat conducting layer 15 can be made of aluminum foil and the surface area of the heat conducting layer 15 is larger than the top surface area of the heat generation device 13. Thereby, the generated heat can be distributed all over the top surface of the quadrilateral base plate 1. The power connection line 14 is provided in the recessed area 10 of each quadrilateral base plate 1, surrounds peripheries of the heat generation device 13 and covered by the layer 11. In addition, the power connection line 14 is respectively connected with the power connector part 12 and the heat generation device 13. Consequently, when the power connection line 14 is connected with an external power, the power connector part 12 and the heat generation device 13 all can be in electric connection via the power connection line and consequently the heat generation device 13 begins to produce heat.

Each of the plurality of the connectors 2 has two ends that are respectively provided with a conductive part 21, 22. The two conductive parts 21, 22 are conductive to each other.

Figure 5:
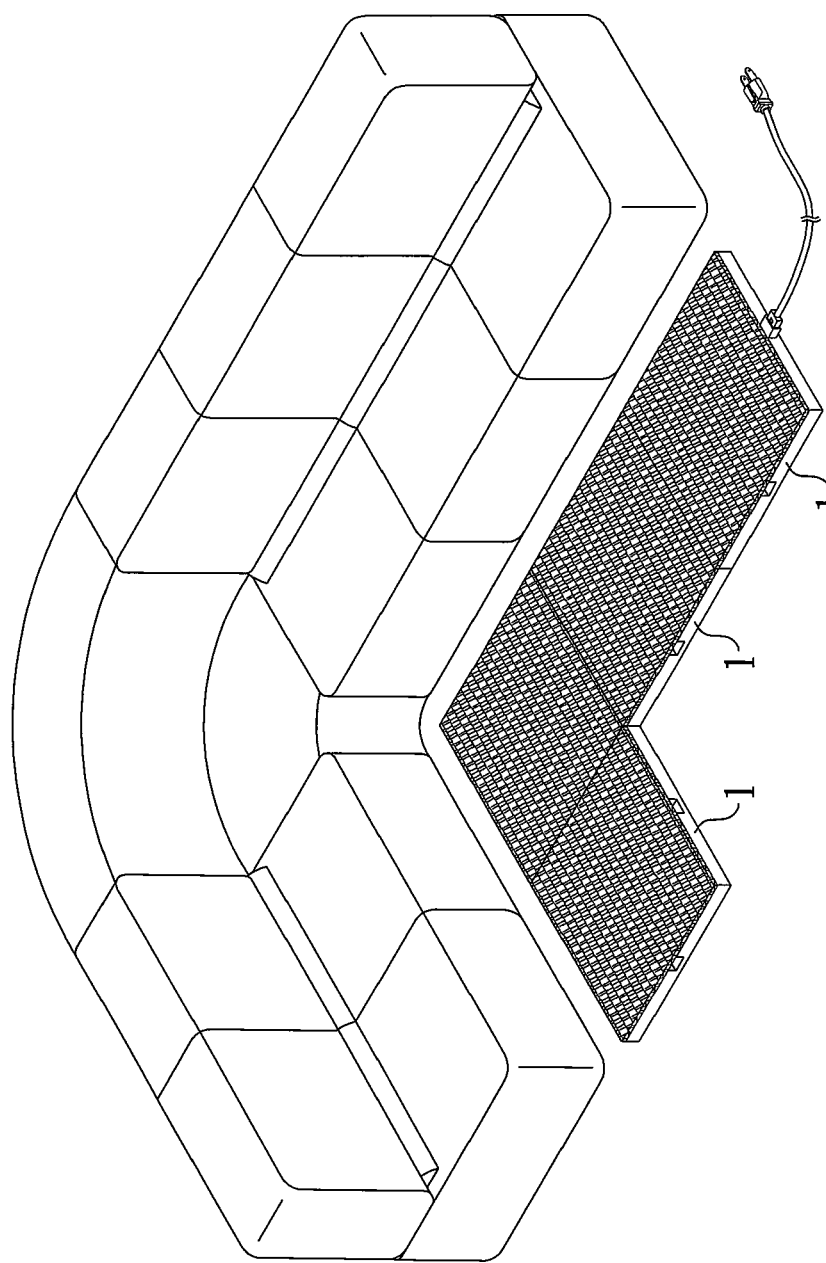
FIG. 5 is a schematic view showing a L-shape carpet assembly capable of generating heat that is formed by assembling a plurality of quadrilateral base plates of the present invention.

Therefore, in implementation, as shown in FIG. 5 in this embodiment, users are able to assemble a large-area carpet assembly capable of generating heat according to their need. First of all, users can connect the conductive parts 21, 22 provided at two ends of each connector 2 respectively to the power connection part 12 provided at one periphery of one polygonal base plate 1. After that, another periphery of that polygonal base plate 1 can be connected with another polygonal base plate 1 via another connector 2. Accordingly, the plurality of polygonal base plates 1 can be assembled to form a carpet assembly in various shapes. Moreover, when the power connection part 12 of one of the polygonal base plates 1 is connected with a power, by means of each power connection line 12 and the conductive parts 21, 22 of each connector 2, the electricity will be conducted to the heat generation devices 13 of all polygonal base plates 1 to generate heat. Furthermore, the generated heat can be uniformly distributed all over the top surface of the polygonal base plate 1 by means of the heat conducting layer 15.

In this way, according to the present invention, users can predetermine the size and shape of the carpet assembly capable of generating heat in accordance with their need and then to place it only on the area where they will stand or walk on. By means of the plurality of the connectors 2, the plurality of the polygonal base plates 1 can be assembled to be in various shape and can be placed on the floor to perform the warming function after being electrified. According to the present invention, the assembled carpet assembly capable of generating heat can be placed on only part of a floor rather than necessarily on the whole floor. In addition to standing or walking thereon, users also can sit or lie on the carpet assembly capable of generating heat. Moreover, when it is not in use any more, it is convenient and takes less time to dissemble and store the carpet assembly capable of generating heat. It is not only convenient to use, but it also be able to save the maintenance cost and to reduce the electric bill.

Figure 6:
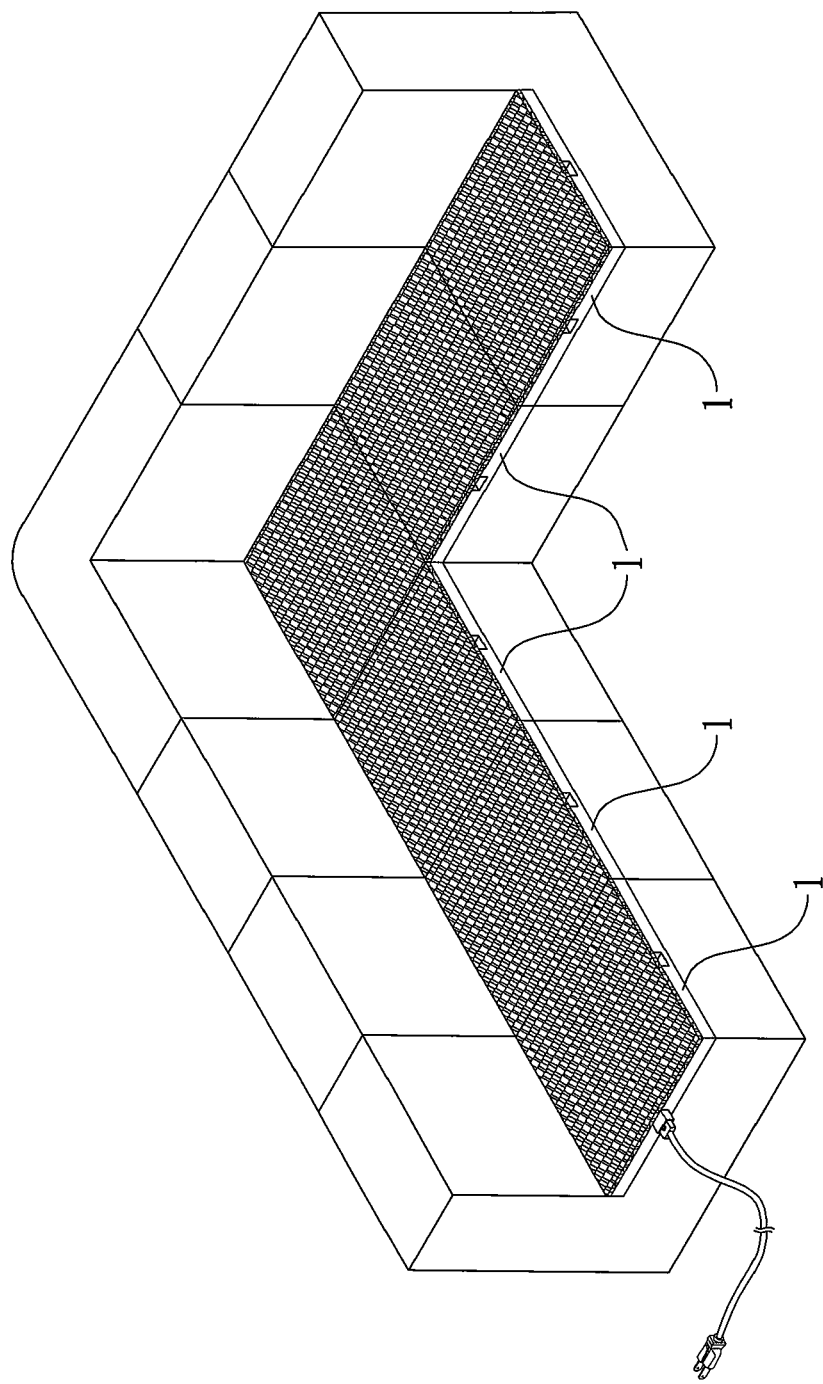
FIG. 6 is a schematic view showing that the carpet assembly capable of generating heat of the present invention is placed on a sofa to perform the function of an electric heating pad.

In addition, as shown in FIG. 6, the assembled carpet assembly according to the present invention also can be placed on the beds or sofas of various shapes. Therefore, the carpet assembly capable of generating heat can perform the same function of electric blankets or electric heating pads for users to sit or lie thereon. According, it is able to fulfill the purpose of keeping body warm.

As disclosed in above descriptions and attached drawings, the present invention provides a carpet assembly capable of generating heat. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

The invention claimed is:

1. A carpet assembly for indoor use and capable of generating heat, comprising:
    a plurality of quadrilateral base plates, each of which has:
    a top surface that is provided thereon with a layer and has a center provided with a recessed area, where the recessed area is communicated with a channel formed at four peripheries of each quadrilateral base plate;
    four power connector parts, provided respectively in the channels at four peripheries of each quadrilateral base plate and covered by the layer;
    a heat generation device, provided on the recessed area and covered by the layer;
    a heat conducting layer, provided between the layer and the heat generation device and covering the heat generation device for conducting heat all over the top surface of the quadrilateral base plate, wherein the surface area of the heat conducting layer is larger than the top surface area of the heat generation device;
    a power connection line, independently provided in the recessed area, surrounding the peripheries of the heat generation device and covered by the layer, wherein the power connection line is respectively connected electrically with the four power connector parts at the peripheries of each quadrilateral base plate and the heat generation device, so that when the power connection line is connected with an external power, the power connector part and the heat generation device are all in electric connection via the power connection line, and consequently the heat generation device begins to produce heat; and
    a plurality of connectors, each of which has two ends that are respectively provided with a conductive part, and the two conductive parts are in conduction to each other, where one end of each connector is located at the channel of one quadrilateral base plate, and the other end of the connector is located at the channel of another adjacent quadrilateral base plate;
    wherein the conductive parts at the two ends of each connector are respectively connected with the power connector parts of any two adjacent quadrilateral base plates, the two adjacent quadrilateral base plates are in electric connection with each other by the connector and are abutted with each other;

whereby the plurality of the quadrilateral base plates is assembled in the way of providing each connector between any two quadrilateral base plates, so as to form a carpet assembly capable of generating heat.

2. The carpet assembly capable of generating heat as claimed in claim 1, wherein the heat conducting layer is made by aluminum foil.

3. The carpet assembly capable of generating heat as claimed in claim 1, wherein the heat conducting layer is made by aluminum foil.

4. The carpet assembly capable of generating heat as claimed in claim 1, wherein the heat generation device is an electric heater.

* * * * *